(12) United States Patent
Uriu et al.

(10) Patent No.: US 6,430,157 B1
(45) Date of Patent: *Aug. 6, 2002

(54) COMMUNICATION CONTROLLING APPARATUS

(75) Inventors: Shiro Uriu, Kawasaki; Kazumasa Sonoda, Fukuoka; Hiroshi Ishiwata, Kawasaki, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,815

(22) Filed: Mar. 25, 1998

(30) Foreign Application Priority Data

Oct. 20, 1997 (JP) ............................................. 9-287480

(51) Int. Cl.⁷ ................................................ H04L 12/00
(52) U.S. Cl. ..................... 370/236.1; 370/229; 370/235; 370/249
(58) Field of Search ................................. 370/229–236, 370/249, 252, 253, 412, 395, 465, 468, 236.1

(56) References Cited

U.S. PATENT DOCUMENTS

| | | | | |
|---|---|---|---|---|
| 5,909,433 A | * | 6/1999 | Fichou et al. ................ | 370/412 |
| 5,940,368 A | * | 8/1999 | Takamichi et al. ........... | 370/229 |
| 5,940,375 A | * | 8/1999 | Soumiya et al. ............. | 370/249 |
| 6,141,321 A | * | 10/2000 | Lee ............................. | 370/229 |
| 6,269,078 B1 | * | 7/2001 | Lakshman et al. ........... | 370/230 |

FOREIGN PATENT DOCUMENTS

| | | |
|---|---|---|
| JP | 09036880 | 2/1997 |
| JP | 09074420 | 3/1997 |

* cited by examiner

*Primary Examiner*—Wellington Chin
*Assistant Examiner*—Maikhanh Tran
(74) *Attorney, Agent, or Firm*—Katten Muchin Zavis Rosenman

(57) ABSTRACT

A switching system in an ATM switching system accommodating an ABR is constructed of an individual units connected to a transmitting terminal or a receiving terminal to implement an efficient bandwidth authorization, and a plurality of intra-system relay devices having transmission allowed rate calculating units. In this switching system, there are separated a transfer of a management cell between the transmitting terminal or the receiving terminal and the individual unit and a transfer of the management cell between the plurality of intra-system relay devices.

3 Claims, 18 Drawing Sheets

RATE = $2^e \times \{1 + m / 512\} \times nz$ (cell/sec)

FIG. 6

| CLASSIFICATION OF CELL | JUDGING CONDITION | |
|---|---|---|
| | RM-CELL DISCRIMINATE ELEMENT (RM) | RM-CELL DIRECTION DISCRIMINATE ELEMENT (DIR) |
| Forward RM Cell | RM=1 | DIR=0 |
| Backward RM Cell | RM=1 | DIR=1 |
| User Data Cell | RM=0 | NONE (don't care) |

FIG. 7

1 bit

| LOAD PROCESSING MODE |
|---|

LOAD PROCESSING MODE: 0 = LOAD PROCESS IS EXECUTED PER QCP
1 = LOAD PROCESS IS EXECUTED WITH INTEGRATION OF PLURALITY OF QCPs

FIG. 8

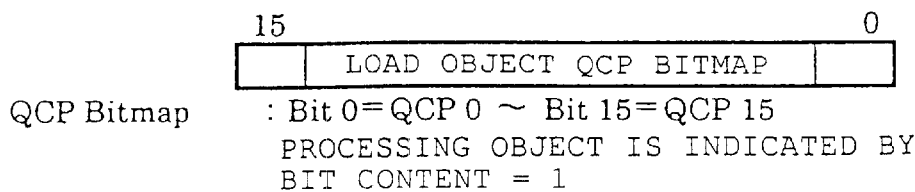

QCP Bitmap : Bit 0 = QCP 0 ~ Bit 15 = QCP 15
PROCESSING OBJECT IS INDICATED BY BIT CONTENT = 1

FIG. 9

```
                       27 bits
address         26                         0
HW+QCP         ┌───────────────────────────┐
               │  COUNTING OF RECEIVED CELLS│
               └───────────────────────────┘
         COUNTING OF RECEIVED CELLS: NUMBER OF RECEIVED
                                     CELLS OF RELEVANT
                                     HW/QCP
```

FIG. 10

```
                 4 bits
            3            0
           ┌──────────────┐
           │OBSERVATION TIME VALUE│
           └──────────────┘
OBSERVATION TIME VALUE: VALUE FOR USE IF THE ONE OBTAINED BY
                       DECODING VALUE REPRESENTING BASIC TIME
                       VALUE IN OBSERVATION PERIOD
          Default = 001000000 (h)
```

FIG. 11

```
                   16 bits
            15                       0
           ┌───────────────────────┐
           │    BASIC TIME LENGTH  │
           └───────────────────────┘
BASIC TIME LENGTH : TIME BECOMING BASIS OF OBSERVATION PERIOD
                   IS EXPRESSED BY CELL TIME
          Default = AE63 (h)    7.8125 msec
```

FIG. 12

| OBSERVATION PERIOD (sec) | CONTENT OF OBSERVATION TIME VALUE | SOFTWARE SET VALUE |
|---|---|---|
| 1/128 | 0 0 0 0 0 0 0 1 (b) | 0 (h) |
| 1/64 | 0 0 0 0 0 0 1 0 (b) | 1 (h) |
| 1/32 | 0 0 0 0 0 1 0 0 (b) | 2 (h) |
| 1/16 | 0 0 0 0 1 0 0 0 (b) | 3 (h) |
| 1/8 | 0 0 0 1 0 0 0 0 (b) | 4 (h) |
| 1/4 | 0 0 1 0 0 0 0 0 (b) | 5 (h) |
| 1/2 | 0 1 0 0 0 0 0 0 (b) | 6 (h) |
| 1 | 0 1 0 0 0 0 0 0 (b) | 7 (h) |
| 2 | 1 0 0 0 0 0 0 0 (b) | 8 (h) |

FIG. 13

```
              9 bits
       8_____0
       COUNTING OF OBSERVATION TIME
COUNTING OF OBSERVATION TIME: COUNTING PER
                              BASIC TIME
```

FIG. 14

```
              16 bits
       15_____0
       COUNTING OF BASIC TIME
COUNTING OF BASIC TIME: COUNTING OF BASIC TIME OF
                        OBSERVATION PERIOD (CELL TIME)
```

TARGET OUTPUT
BANDWIDTH: TARGET OUTPUT BANDWIDTH OF QCP IS
SET IN RATE REPRESENTATION

LOAD COEFFICIENT: LOAD COEFFICIENT OF HW/QCP IS STORED
IN RATE REPRESENTATION

ER OBJECT QCP: SETTING OF QCP CLASS BECOMING OBJECT
FOR ER PROCESS
IMPLICATION IS BIT0 = QCP0... BIT15 =
QCP15, IMPLICATION IS BIT CONTENT
"1" = ER PROCESSING OBJECT

FIG. 18

```
                      1 bit
                 ┌──────────┐
                 │ MACR MODE │
                 └──────────┘
MACR MODE :  0 = MACR IS CALCULATED ACCORDING TO
                 QCP CLASS
             1 = MACR IS CALCULATED WITH
                 INTEGRATION OF PLURALITY OF QCPs
```

FIG. 19

```
                       3 bits
address             2          0
  HW+QCP         ┌──────────────┐
                 │CONGESTION LEVEL│
                 └──────────────┘
CONGESTION LEVEL : CONGESTION LEVEL OF HW/QCP IS STORED
                   0 = NON-CONGESTION /
                   1 = CONGESTION /
                   2 = DOUBLE-CONGESTION
```

FIG. 20

```
                       1 bit
              ┌─────────────────────┐
              │CONGESTION PROCESSING MODE│
              └─────────────────────┘
CONGESTION
PROCESSING MODE : 0 = CONGESTION PROCESS IS EXECUTED
                      PER OUTPUT HW/QCP
                  1 = CONGESTION PROCESS IS EXECUTED
                      PER QCP ALONE
```

MACR : AVERAGE ACR OF HW/QCP IS STORED IN
       RATE REPRESENTATION

AF : AVERAGE FACTOR OF QCP IS STORED

BWAG: MACR ADDITION RATE OF QCP IS
      STORED IN RATE REPRESENTATION

ER RATIO 4: ER RATIO FOR CONGESTION LEVEL 4
ER RATIO 3: ER RATIO FOR CONGESTION LEVEL 3
ER RATIO 2: ER RATIO FOR CONGESTION LEVEL 2
ER RATIO 1: ER RATIO FOR CONGESTION LEVEL 1

※ ER RATIO IS 3 BITS AND HENCE RIGHT-SIDE 3
BITS ARE VALID IN CONTENTS OF ER RATIOS 1 - 4
IN TABLE, I WICH MSB 1 BIT IS "0"

COMMUNICATION CONTROLLING APPARATUS

BACKGROUND OF THE INVENTION

The present invention relates to a technology effective in an application to a switching system capable of accommodating an unspecified bit rate (UBR) service together with an available bit rate (ABR) service. An available bit rate (ABR) service in an asynchronous transfer mode (ATM) network has a peak cell rate PCR declared on a terminal side and a minimum cell rate MCR, and is such that the ATM network, though incapable of sending an ATM cell at a rate exceeding the peak cell rate PCR, assures that the ATM cell be sent at the minimum cell rate MCR, and that the ATM cells are sent with the terminal selecting a rate between the peak cell rate PCR and the minimum cell rate MCR corresponding to a status of the ATM network.

In this ABR service, the terminal is notified of the status of the ATM network by use of a resource management cell (hereinafter abbreviated to an "RM cell"). This RM cell is sent every time a fixed number of user cells are sent, and a receiving terminal, when the RM cell arrives at the receiving terminal via the ATM network, sends this RM cell back to the transmitting terminal. AT this time, the receiving terminal writes items of bandwidth information and congestion information to the RM cell and transmits the same cell.

Then, the transmitting terminal having taken in the RM cell sent back thereto recalculates an allowed cell rate ACR, and the communications are performed at a cell rate under this allowed cell rate ACR.

As discussed above, a QOS (quality of service) is assured by avoiding a congestion under feedback control of the RM cell.

On the other hand, an UBR (unspecified bit rate) service is of such a system that flow control is conducted in a high-order layer between the transmitting terminal and the receiving terminal with respect to the bandwidth control, and a switching equipment does not get involved in this control. Hence, there might be a possibility in which a cell loss occurs due to a fluctuation in a free resource.

Incidentally, it is presumed that the method will be centered on the congestion control based on the above ABR from now on, however, the following problems are pointed out.

First, as for the ABR, the congestion control is implemented by transferring and receiving the RM cell between the terminals, and therefore the RM cell is fed back in a large loop such as: the transmitting terminal→the switching system→the receiving terminal→the switching system→the transmitting terminal. Consequently, there arise a problem in which a time for the control increases, and a utilizing efficiency of the system decreases. In particular, even though the data transfer within the switching system can be kept at a high speed, it impossible to increase a processing speed between terminal devices, and therefore a great number of buffers are required.

It is a primary object of the present invention, which was contrived under such circumstances, to enable feedback control to be implemented for a UBR service not originally having the feedback control by dividing a transfer route of control information through an RM cell etc for the feedback control between an external device (a terminal) and a system and between intra-system devices, reducing a control information transfer delay time with an execution of such control as to provide a loop within respective route, and performing loop control for transferring the control information within the system.

Note that Japanese Patent Application Laid-Open Publication No.9-74420 may be used with respect to the loop control between the switching system and the external device.

SUMMARY OF THE INVENTION

To accomplish the above object, according to a first aspect of the present invention, in an ATM communication line control apparatus for storing a management cell with a transmission allowed rate and making a notification thereof, a switching system comprises an individual unit connected to a transmitting terminal or a receiving terminal, and a plurality of intra-system relay devices having transmission allowed rate calculating units. In this switching system, there are separated a transfer of a management cell between the transmitting terminal or the receiving terminal and the individual unit and the transfer of the management cell between the plurality of intra-system relay devices.

There are separated the transfers of the management cells between the transmitting terminal (the receiving terminal) and the individual device and between the intra-system relay devices, whereby an allowed rate can be determined promptly without causing any delay of the determination of the transmission allowed rate due to a delayed arrival of the management cell.

According to a second aspect of the invention, the transmission allowed rate calculating unit calculates an allowed bandwidth on the basis of a cell outflow value registered in the forward management cell, makes a congestion judgement on the basis of a load observation using the number of cells received, and modifies the allowed bandwidth with a value of this judgement.

The allowed bandwidth calculated is further modified based on the congestion judgement, whereby a more accurate transmission allowed rate can be determined.

BRIEF DESCRIPTION OF THE DRAWINGS

FIG. 6 is a chart showing a cell classification judgment condition;

FIG. 7 is a diagram showing a construction of a load precessing mode register;

FIG. 8 is a diagram showing a construction of a load object QCP register;

FIG. 9 is a diagram illustrating a construction of a received cell counter;

FIG. 10 is a diagram illustrating a construction of a observation time value register;

FIG. 11 is a diagram illustrating a construction of a basic time register;

FIG. 12 is a setting chart showing an observation period and a software set value;

FIG. 13 is a diagram illustrating a construction of an observation time counter;

FIG. 14 is a diagram showing a construction of a basic time counter;

FIG. 18 is a diagram illustrating a construction of an MACR mode register;

FIG. 19 is a diagram showing a structure of a congestion level table;

FIG. 20 is a diagram showing a construction of a congestion processing mode register;

DETAILED DESCRIPTION OF THE PREFERRED EMBODIMENT

The present invention will hereinafter be discussed with reference to the accompanying drawings.

Figure 1:
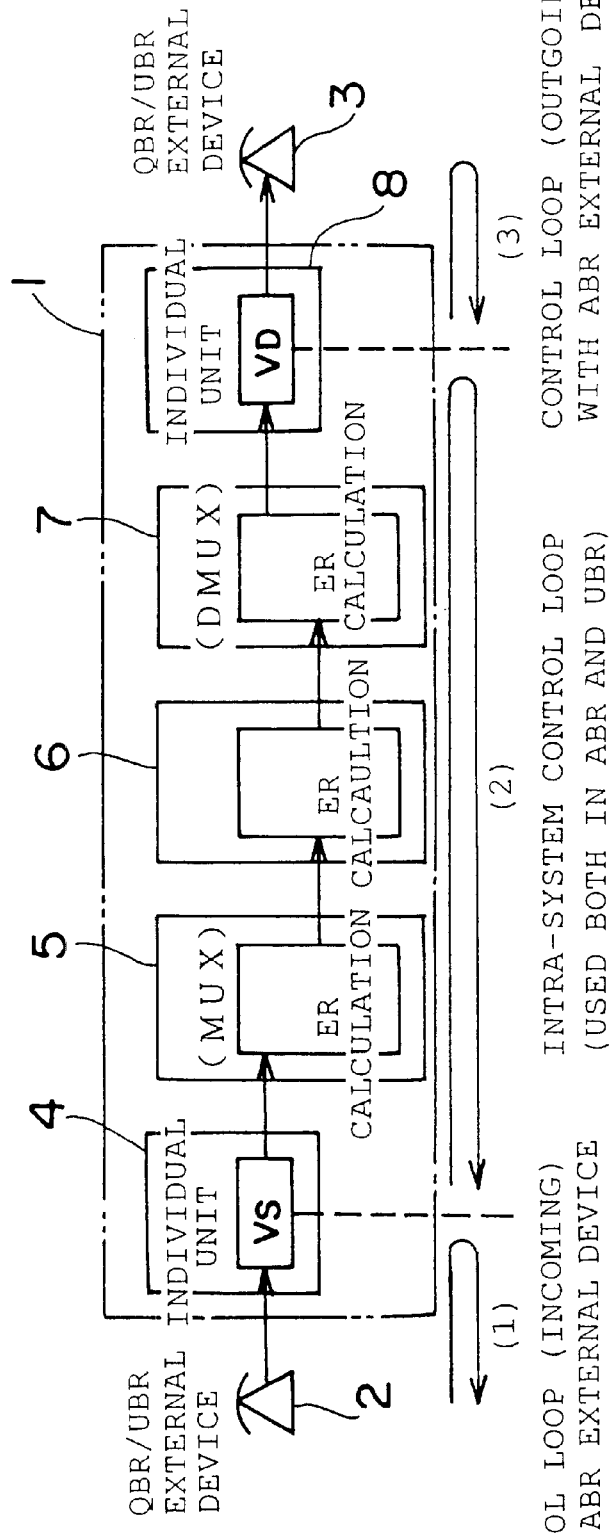
FIG. 1 is a schematic diagram showing a whole ATM switching system according to the present invention.

FIG. 1 is a block diagram illustrating a construction in the present embodiment.

As shown in FIG. 1, an ATM switching system in this embodiment is constructed of a switching system 1, a transmitting-side external device 2 and a receiving-side external device 3.

The switching system 1 includes a transmitting-side individual unit 4, a multiplexer 5, a switch 6, a demultiplexer 7 and a receiving-side individual unit 8. Referring again to FIG. 1, the transmitting-side individual unit 4 functions as a virtual source (VS), while the receiving-side individual unit 8 functions as a virtual destination (VD).

Figure 2:
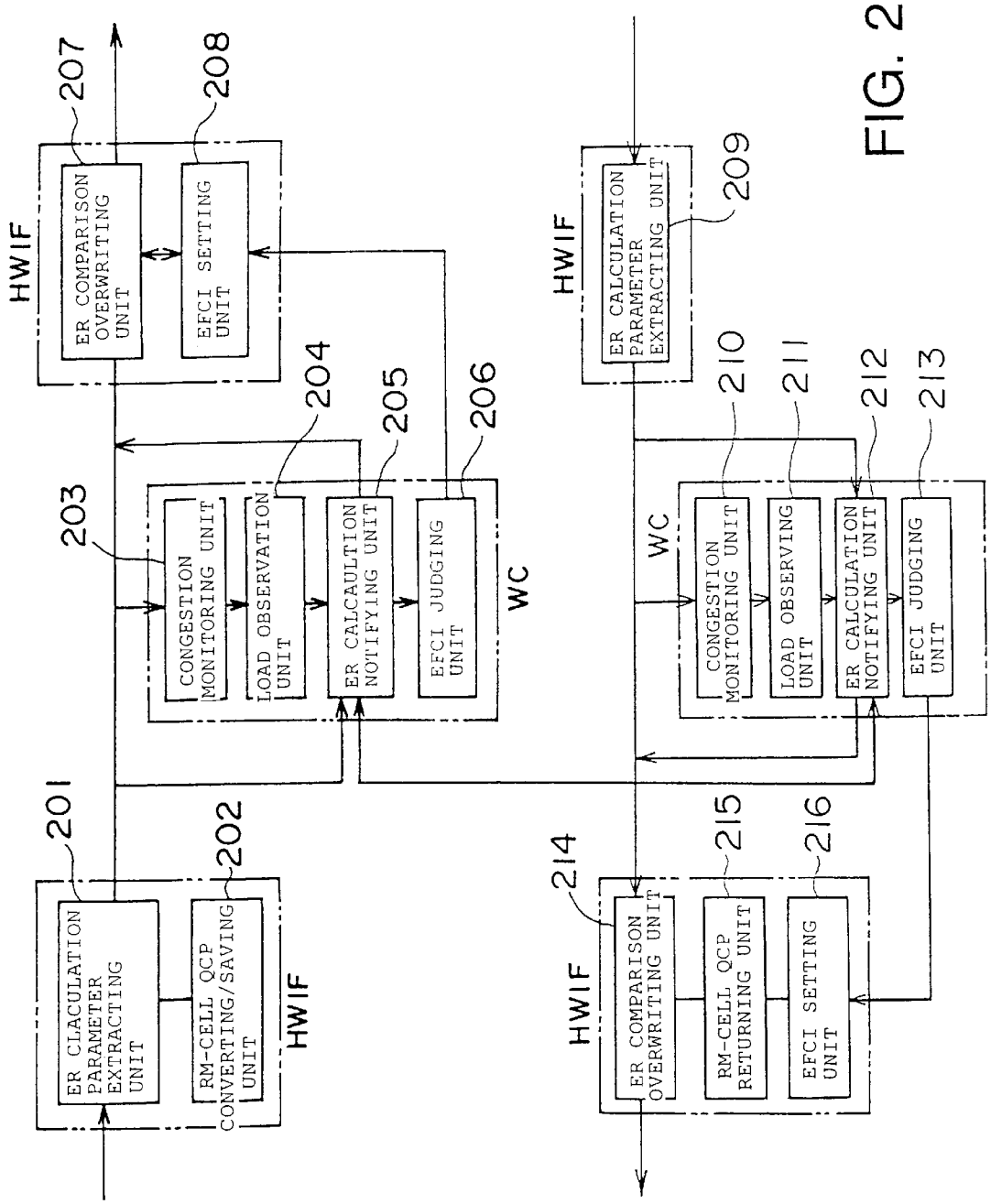
FIG. 2 is a block diagram illustrating a construction of an AIFSH common unit of the present invention.

The individual units, 5, 8 and the switch 6 in the system are each provided with an AIFSH common unit. FIG. 2 illustrates an internal configuration thereof.

This embodiment of the present invention is characterized by the AIFSH common unit for performing an ER calculation.

In the ER calculating process in this embodiment, a mean allowed cell rate (MACR) is calculated based on a value of a current cell rate (CCR) in an RM cell in a forward direction. Further, there are executed a load observation using the number of cells received and a congestion judgement using a Que length, and the MACR is modified based on these conditions, thereby calculating a final ER.

As shown in FIG. 2, the AIFSH common unit is separated into a module consisting of an interface HWIF and a processing unit WC that implement processes in an upstream direction (an upper half part in FIG. 2), and a module consisting of an interface HWIF and a processing unit WC that implement processes in a downstream direction (a lower half part in FIG. 2).

Figure 3:
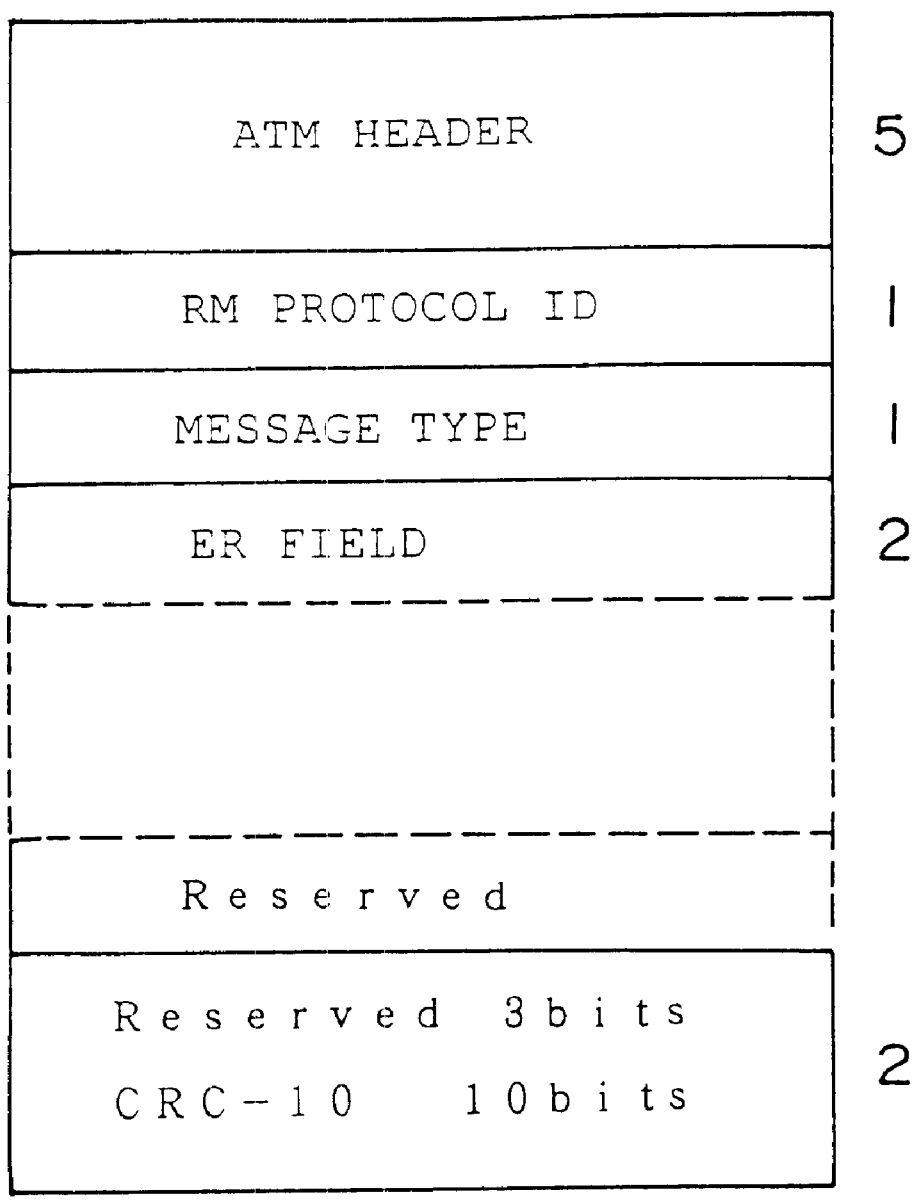
FIG. 3 is a diagram showing a format of an RM cell.

An ER calculation parameter extracting unit 201 incorporates a function of latching an ER (explicit rate) calculation parameter from within the cell received. Herein, the RM cell has a format shown in FIG. 3. To be more specific, the RM cell includes a 5-octet header, a 1-octet RM protocol ID, a 1-octet message type, a 2-octet ER field a 2-octet reserve area and a check code.

Figure 4:
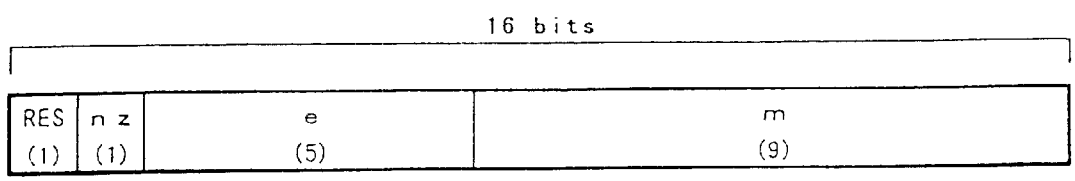
FIG. 4 is a diagram showing a format of an ER parameter.

The above-describe ER calculation parameter is stored in the ER field. FIG. 4 shows a format of this parameter by way of one example thereof. This format has a 16-bit structure, wherein a rate is shown. Then, the rate is expressed by the following formula according to this format.

[Formula 1]

Rate=$2^e \times \{1+m/512\} \times nz$ (cell/sec)

An RM cell QCP conversion saving unit 202 has a function of making a judgement about a QCP converting/processing object and saving an intra-cell QCP into other field.

A congestion monitoring unit 203 has a function of monitoring a Que length with respect to a QCP class designated by the software, and makes a judgement about a non-congestion, a congestion and a double-congestion. More specifically, respective threshold values thereof are set by the software, and, if over the respective threshold values, it is judged that the congestion and the double-congestion occur.

A load observation unit 204 incorporates a function of counting the number of cells received, and calculating a load coefficient with respect to the QCP class.

The number of cells received is counted by repeating (1) a judgement about received cell count precessing objects (a cell classification and QCP) and (2) a process of incrementing a count value of the cells received every time the ER calculation parameter is received from the ER calculation parameter extracting unit 201.

Note that if out of the object in the judgement about the received cell count processing object, the number of the cells received is not counted. What is aimed at are a user cell of the load observation designated QCP and the RM cell of an MACR (mean allowed cell rate) calculation out-of-object QCP as well as of the load observation designated QCP (which will hereinafter be explained in greater detail).

A calculation of a load coefficient involves, as shown in the formulae which follows, calculating an input rate BWI from a fixed period of observation time TN and a number-of-cells Np arrived during this period, and further calculating a target bandwidth BWO. The load coefficient is calculated from a ratio between the input rate BWI and the target bandwidth BWO.

Note that a value of the target bandwidth BWO becomes different depending on statuses of the non-congestion and of the congestion when calculated.

[Formula 2]

Input Rate BWI (cell/sec)=Number-of-Arrived-Cells Np (cell)/Observation Time TN (sec)

[Formula 3]

Target Bandwidth BWO (cell/sec)=ABR Bandwidth BWA (cell/sec)×Target Activity Ratio ρTARGET Target Activity Ratio ρTARGET→Non-Congestion=1.0→Congestion=ρ1

Load Coefficient OLF (Over Load Factor)=Input Rate BWI/Target Output Bandwidth BWO An ER calculation notifying unit 205 further incorporates a MACR (mean allowed cell rate) information storing function, an MACR calculating function, an ER calculating function and an ER notifying function.

The MACR information storing function works to (1) make the judgement about the MACR calcualtion procesing objects (the cell classification and the QCP), and to (2) store an MACR informaton FIFO memory with an item of MACR calculation information. These processes are to be repeated.

Incidentally, if out of the object in the MACR calculation processing object judgement, the FIFO memory is not stored with the MACR calculation information. What is aimed at is only the forward-directional RM cell (F-RM) of the MACR calculating process designated QCP.

In the MACR calculating function, the MACR is, although calcualted based on the QCP class designated by the software, reckoned based on the followng condition when the RM cell arrives in the forward direction. Note that the CCR takes a value as it has in that RM cell.

(Condition 1)

When CCR<MACR in the congested status, or when CCR>MACR in the non-congested status, MACR=α×CCR+(1−α)×MACR (α=default 1/16)

(Condition 2)

When the load coefficient OLF<1 in the non-congested status,

MACR=MACR+BWA×γ(γ=default 0.1)

MACR=min (MACR, BWO)

The ER calcualting function works to calculate ER with respect to the QCP class designated by the software under the following conditions.

When in the non-congested status, ER=MACR

When OLF≦1 in the congested status, ER=MACR

When OLF<1 in the congested status, ER=MACR/OLF

When in the non-congested/congested status, ER=max (MACR, ER), and further

When in the double-congested status, ER=MCR

The ER notifying function involves judging whether the ER information is valid or invalid, and notifying an ER comparison overwriting unit 207 in the interface HWIF of the same ER information as well as notifying a downstream-directional ER calculation notifying unit 212. Note that if the ER information is invalid, these notifications are not implemented.

The ER comparison overwriting unit 207 executes a process of comparing the ER value calculated when the forward or backward RM cell arrives with the ER value in the RM cell, and, if the calculated ER value is smaller than the intra RM cell ER value, rewriting the intra RM cell ER value.

An RM cell QCP returning unit 215 executes a process of making the judgement about a QCP returning process object (the cell classification and the QCP), and returning the QCP value to the RM-QCP value saved so far.

EFCI judging units 206, 213, every time the ER calculation parameter is received, (1) make the judgement about the EFCI processing objects (the cell classification and the QCP), (2) read a congestion level, (3) make an ON/OFF judgement about EFCI setting based on the congestion level, and (4) notify an EFCI setting unit of a result of the judgement. Note that if out of the object in judgement about the EFCI processing object, there are executed no processes from the congestion level reading process onwards. What is be processed is only a valid cell of the designated QCP.

EFCI setting units 208, 216, each time the cell is read, (1) latch an EFCI setting parameter from te read cell, (2) make the judgement about the EFCI processing object (the cell classification), (3) read the EFCI setting, and (4) carry out the EFCI setting.

Figure 5:
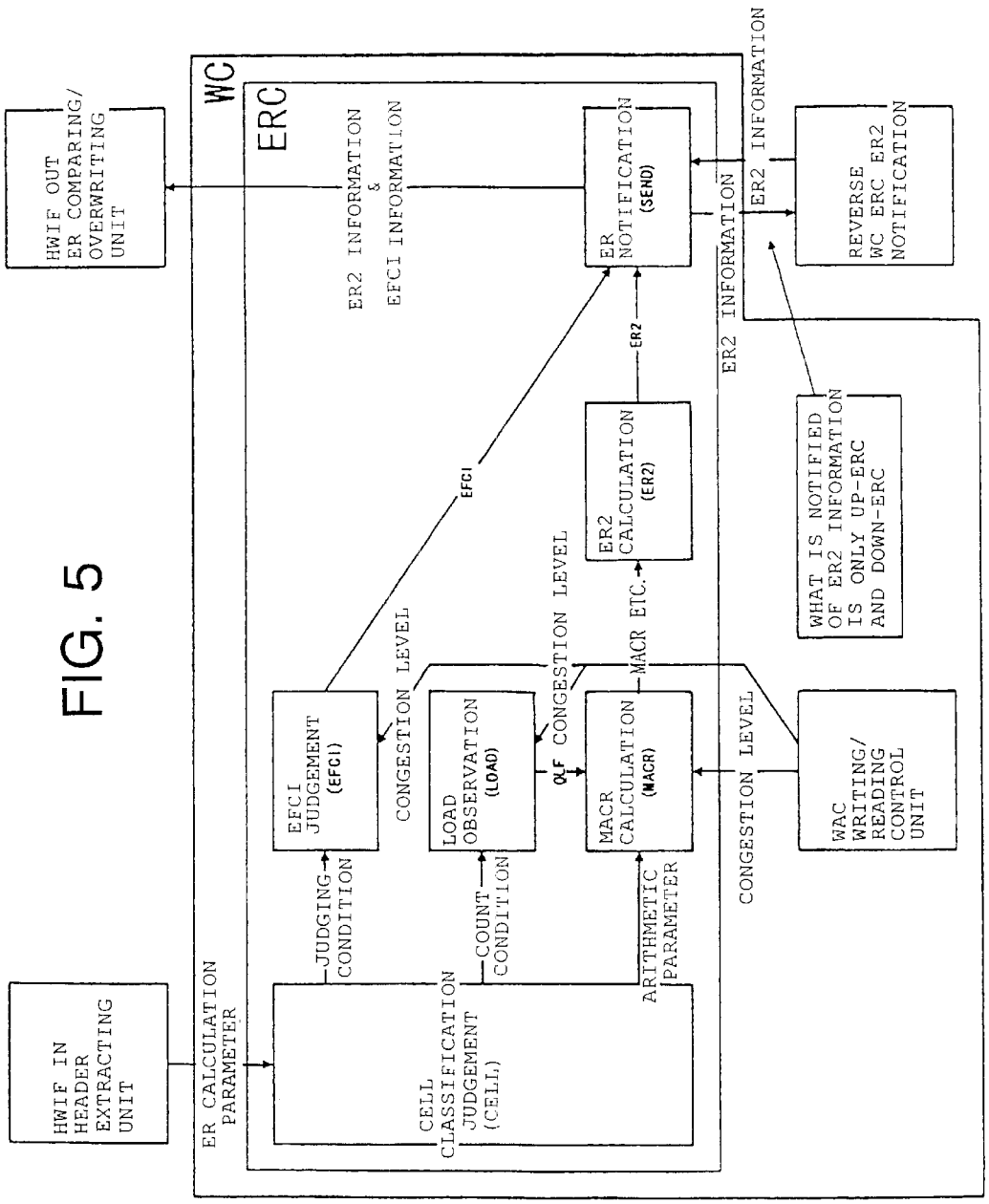
FIG. 5 is a block diagram showing an ERC of the AIFSH common unit.
Figure 29:
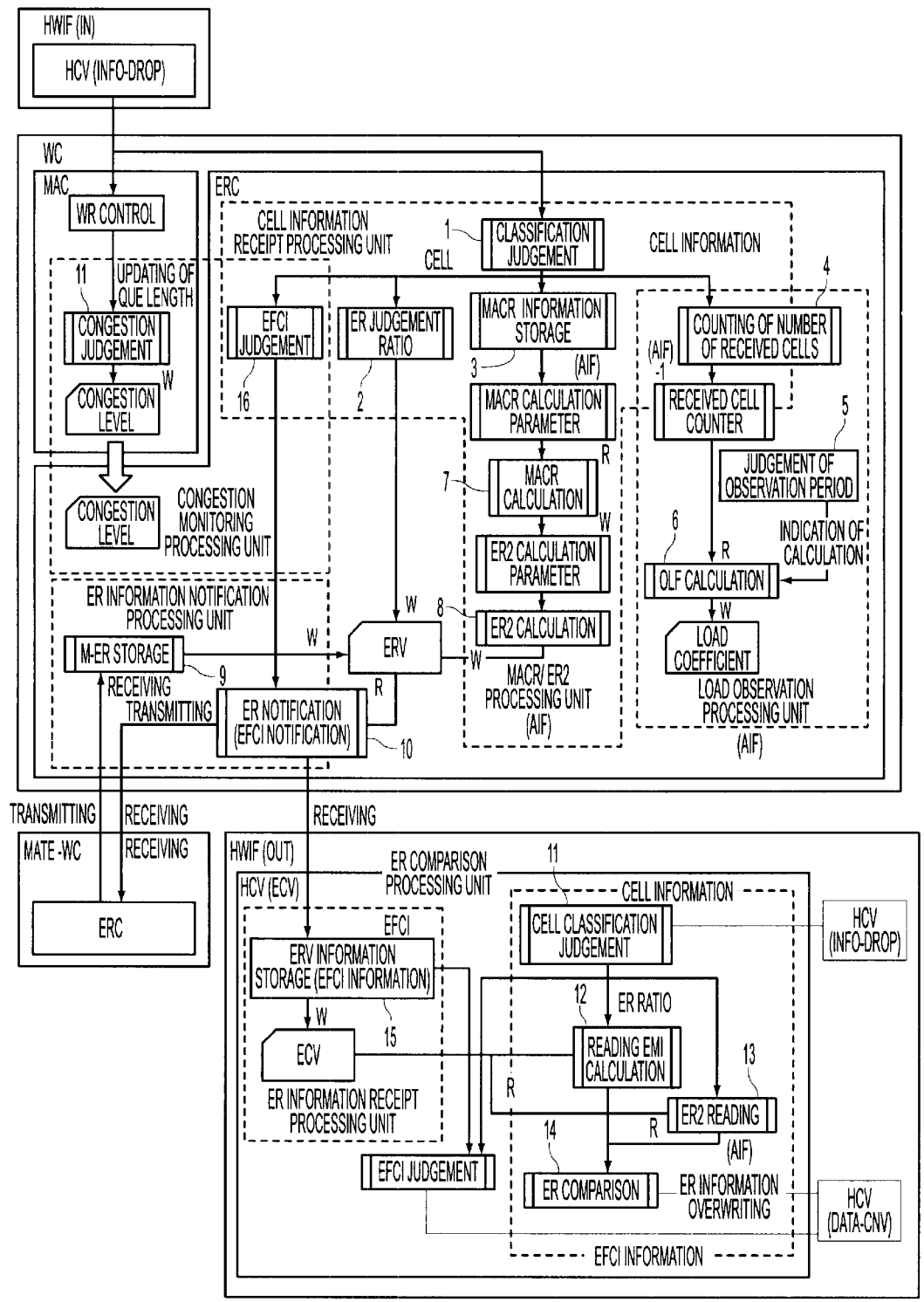
FIG. 29 is a processing flowchart of ERC.

Next, the load observation, the ER calculation and the EFCI judgement will be discussed in greater details with reference to FIGS. 5 and 29.

Figure 30:
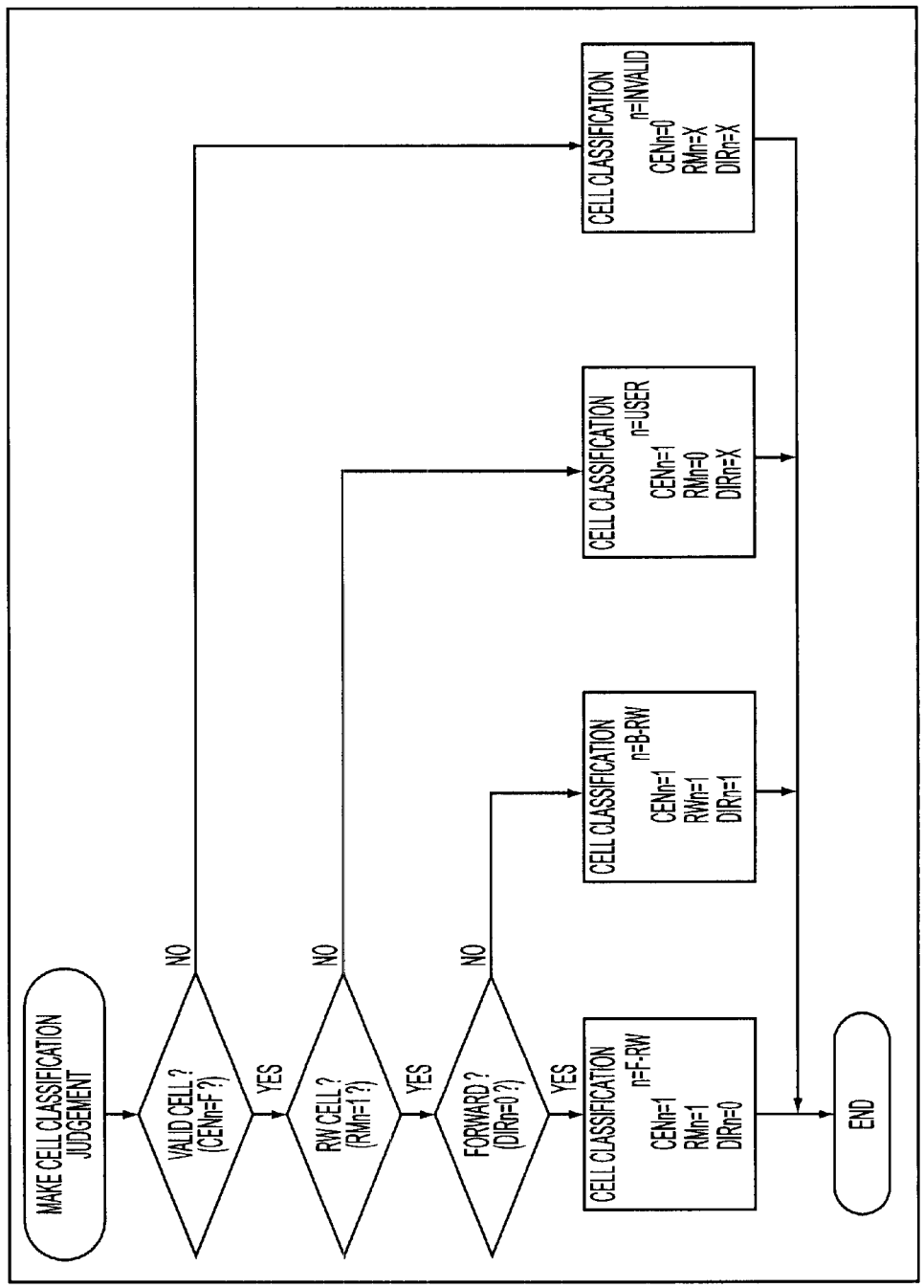
FIG. 30 is a processing flowchart of an ER calculation.

To start with, a cell classification judging block is executed based on a flow of processing shown in FIG. 30 by receiving cell valid/invalid information, output destination HW information, a QCP class, an RM-cell QCP class, error information, an RM cell identifier, an RM cell direction identifier and an intra RM cell CCR value from the header information extracting unit (HWIF) when receiving the cell. To begin with, in the case of meeting such conditions that the cell is valid, that there is no parity error in the header part of the input cell and that there are no errors in the table access and in a header converting part, the judgement about the cell classification is made in accordance with Table shown in FIG. 6 on the basis of those pieces of information. As a result of the cell judgement made based on the conditions shown in FIG. 6, if judged to be the RM cell in the forward direction, the MACR calculation block is notified of the parameters for effecting the ER calculation such as, e.g., the output HW information, the RM-cell QCP class, the intra RM cell CCR and the cell valid information etc.

While on the other hand, if judged to be the user data cell, the load observation block is notified of the output HW information, the RM-cell QCP class, the cell valid information etc in order to count the number of cells received. Further, in the case of the valid cell irrespective of the cell classification, an EFCI judgement block is notified of the same items of information as the above-mentioned.

In the load observation block, the number of cells received per output HW/QCP is counted, and the load observation is carried out. Then, the respective load coefficients are calculated at the interval of a fixed period of time.

The load observation process has the following modes, and the mode setting and the processing object QCP setting are effected by setting two types of registers which follow.

(1) The counting and the calculation are executed per output HW/QCP class.

(2) The counting and the calculation are implemented with an integration of a plurality of QCP classes designated per output HW (QCP group).

FIG. 7 shows a load processing mode register having a 1-bit structure. Herein, if a storage value is "0", this implies a mode in which the load process is executed per QCP. If the storage value is "1", this implies a mode in which the load process is carried out with the integration of the plurality of QCPs.

FIG. 8 is a load object QCP register having a 16-bit structure, wherein it is feasible to set which QCP is an object among the QCP0–QCP15.

The load observation block includes a number-of-received-cells counter based on a 27-bit structure as shown in FIG. 9. This counter is incremented, wherein the RM-cell QCP class and the output HW information notified from the cell classification judgement block serve as addresses. This counter is capable of observing the number of cells for 2 seconds at the maximum, and, when counting up to the maximum value, this value is held. In the counting operation, the RM-cell QCP class of the address information is decoded when in the per-QCP mode, and, if the relevant bit in the bitmap is "1", it becomes a count object. Furthermore, when in the QCP group mode, though a method of judging the count object on the basis of the RM-cell QCP class is the same, there is used only a part corresponding to QCP=0 in each output HW.

In the load observation block, the number of received cells per QCP as well as per output HW is read at the interval of a fixed observation period, and an input rate is calculated based on this number of received cells. This observation period is set by an observation time value register having a 4-bit structure shown in FIG. 10. A basic time register illustrated in FIG. 11 is provided together with the observation time value register, and an observation time is expressed such as an observation time count value×basic time.

The basic time register has a 16-bit structure, wherein a time serving as a basis of the observation period is expressed by a cell time. A default value is, e.g., AE63(h) and is set to 7.8125 msec.

The observation period is, with a basic time being 1/128 sec (7.8125 msec), determined from a value of this basic time within a range of 1/128 sec (7.8125 msec) in accordance with Table shown in FIG. 12.

The observation period is measured by a counter illustrated in FIGS. 13 and 14.

A basic time counter sets all to "0" at a start of the observation, and executes a count-up process per cell time. Then, when "basic time count≧basic time register", the basic time counter indicates the observation time counter to count up, and the counter is cleared. Then, the counting continues.

The observation time counter performs the counting in response to the count-up indication given from the basic time counter. Then, when "observation time count≧observation time register (decode value)", the observation time counter gives an indication to start calculating the load coefficient, and the counter is cleared. Then, the counting continues.

In the load coefficient calculating process, the load coefficient of each HW is calculated per QCP of the load processing object at a fixed interval (e.g., every time an (n)th cell is received). Herein, if the load processing mode is set for every designated QCP, the process is executed for all the designated QCPs. Further, if the load processing mode is set for the QCP group, the process is executed with respect to the part corresponding to QCP=0.

Figure 15:
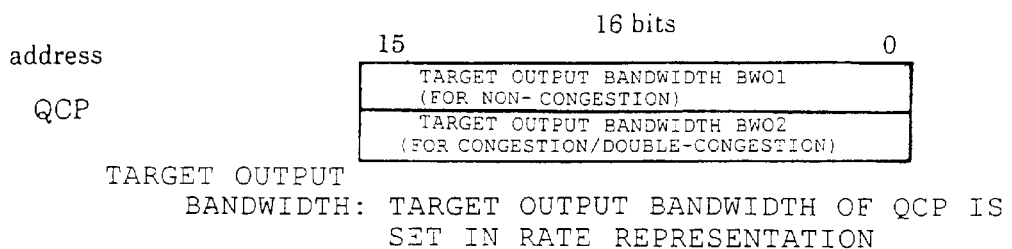
FIG. 15 is a diagram showing a structure of a target output bandwidth table.

In the calculation of the load coefficient, a target output bandwidth BWO1/2 of the QCP to be processed is at first read from a target output bandwidth table shown in FIG. 15. This target output bandwidth BWO1/2 is selectively used depending on a congestion level of the processing object HW/QCP.

The target output bandwidth BWO1/2 set in FIG. 15 is a defined as a target output bandwidth value corresponding to the observation period calculated by the software in the following formula.

Target Output Bandwidth BWOi=ABR bandwidth BWA× Target Activity Ratio ρTARGET÷Observation Period TN where the target activity ratio ρTARGET is ρ1 when in congested status, and is 1.0 when in non-congested status.

Note that target output bandwidth BWOi is usable for every QCP class and is therefore not required to be read each time when calcualted. If this target output bandwidth BWOi is once read with resepct to the relevant QCP, the same value can be used in the calculation of each HW.

Next, the number of cells received is read from the received cell counter (FIG. 9) of the processing object HW/QCP. Herein, when an addition processing mode is for the QCP group, the part corresponding to QCP=0 is employed at all times. The received cell counter is cleared after the reading process.

Subsequentlly, an input rate is obtained by converting the read number of received cells into a rate representation. At this time, in the fiormual (1), a value obtained by decoding a most significant bit "1" in the count value is substituted into "e", and a 9-bit numerical value on the right side of the most significant bit "1" is substituted into "m".

Supposing herein that the number of received cells is 46, the reuslt is: 46 cells→2E(h)→000 0000 0000 0000 0000 0010 1110 (b). Herein, a position of the most significant bit "1" is $2^5$, and hence e=05(h). Nine bits on the right side thereof are 0 1110 000 (b), and therefore m=OEO(h). Accordingly, the result is: count value 2E=rate representation OAEO(h).

The load coefficient OLF is calculated from the above input rate and the target output bandwidth under the following condition. Note that an OLF content is based on the rate representation, wherein the numerical values less than 1.0 are all treated as "0".

Input Rate=Target Output Bandwidth Load Coefficient OLF=1.0 (4000h)

Input Rate<Target Output Bandwidth Load Coefficient OLF=0.0 (0000h)

Input Rate>Target Output Bandwidth Load Coefficient OLF=Calculated as follows.

Load Coefficient OLF=Input Rate BWI/Target Output Bandwidth BWOi

Figure 16:
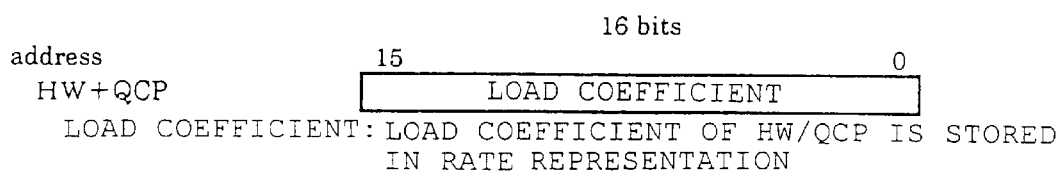
FIG. 16 is a diagram showing a structure of a load coefficient table.

The load coefficient calculated in the way described above is stored in the 16-bit structured load coefficient Table show in FIG. 16, with the processing object HW/QCP being an address. Note that if the load processing mode is for the QCP group, the load coefficient is stored in only the part corresponding to QCP=0 in the output HW.

In the MACR calculation block, MACR is calculated based on the CCR information etc of the RM cell received. This MACR calculation block is classified into an MACR information storage unit and an MACR calculating unit.

The MACR information storage unit makes a judgement about the ER processing object QCP from the RM-cell QCP class notified from the cell classification judgement block. Then, this ER processing object QCP is set in a register shown in FIG. 17. This ER object QCP register has a 16-bit structure, in which each bit position indicates a QCP value. For example, a bit "0" implies QCP0, and a bit "15" implies QCP15. When this bit content is "1", it represents that the relevant QCP is an ER processing object.

When the relevant bit of the RM-cell QCP is "1", the MACR information FIFO memory is stored with output HW bitmap information (16 bits), RM-cell QCP information (4 bits) and intra RM-cell CCR information (16 bits).

The MACR calculating unit includes two modes, i.e., (1) a mode for calculating MACR per QCP as well as HW and (2) a mode for calculating MACR with the integration of the plurality of QCPs designated per HW.

Which one of these two modes is set by a 1-bit structured MACR mode register shown in FIG. 18.

In the MACR calculation, to begin with, if the above-described read data exists in the MACR information FIFO memory, the MACR information stored therein is read out.

Next, the following items of information ((1)–(3)) are read from respective tables or registers, wherein the output HW/QCP read from the ER information FIFO memory serves as an address.

(1) The congestion level information is read from a congestion level table shown in FIG. 19. This congestion level table is based on a 3-bit structure and is stored with a congestion level of HW/QCP thereof. For instance, the bit "0" implies a non-congestion, "1" implies a congestion, and "2" implies a double-congestion. Note that the congestion processing mode is set by a congestion processing mode register shown in FIG. 20. This congestion processing mode register has a 1-bit structure, in which "0" is indicated, this implies that the congestion process is executed per output HW/QCP, and when "1" is indicated, this implies that the congestion process is implemented per QCP. The congestion monitoring unit 203 notifies of contents of the congestion level table and of the congestion processing mode in synchronization with a super multi-frame, and the contents thereof are respectively retained. Then, this item of congestion level information is updated every time the super multi-frame arrives.

(2) The load coefficient OLF information is read from the load coefficient Table shown in FIG. 16. At this time, if the load processing mode is the QCP group mode, there is used only the part corresponding to QCP=0.

Figure 21:
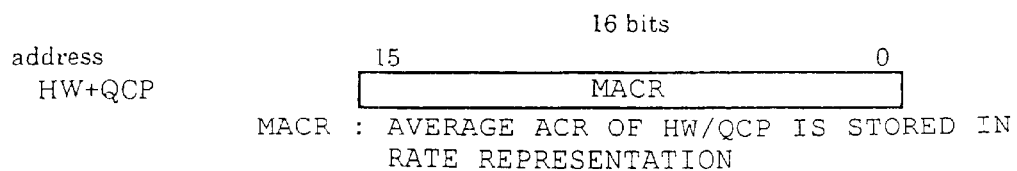
FIG. 21 is a diagram showing a structure of an MACR table.

(3) The MACR information is read out of the MACR Table shown in FIG. 21. This MACR Table has the 16-bit structure, wherein an average ACR of HW/QCP thereof is stored in the rate representation. Note that if the MACR mode is the QCP group mode, there is employed only the part corresponding to QCP=0.

Figure 22:
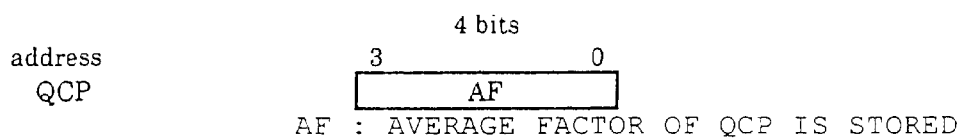
FIG. 22 is a diagram showing a structure of an AF table.

Next, with the QCP serving as the address, an AF (average factor) parameter for calculating the MACR is read from an AF Table shown in FIG. 22. Incidentally, if the MACR mode is the QCP group mode, only the part corresponding to QCP=0, is used.

Note that the average factor AF is a value indicating "n" of $\alpha=1/2^n$, and can be set from "0" to "8".

Figure 23:
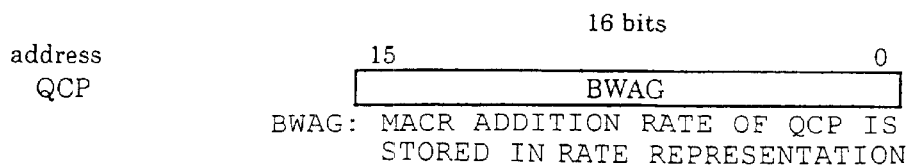
FIG. 23 is a diagram showing a structure of a BWAG table.

Next, an MACR addition rate BWAG is read from a BWAG Table shown in FIG. 23. The MACR addition rate set therein is a value calculated software-wise by the fllowing formula.

MACR Addition Rate BWAG=ABR bandwidth BWA×γ

Next, a targetr output bandwidth BWO2 (for congestion/double-congestion) is read from the target output bandwidth Table shown in FIG. 15. Note that if an addition processing mode is the QCP group mode, there is used only the part corresponding to QCP=0.

The MACR is calculated based on the information read from the respective Tables given above under the following conditions.

(Condition 1)
When congestion level>0, and CCR<MACR congestion level=0, and CCR>MACR,
MACR=AF×CCR+MACR−AF×MACR
where each of calcualtions of AF×CCR and AF×MACR can be done by subtracting AF from a value of "e" among the values each shown in the rate representation.

(Condition 2)
When congestion level=0, and OLF<1,
MACR=MACR+BWAG
MACR=min (MACR, BWO)

The thus calcualted MACR is written to the same address as the reading address, and the value is updated. Accordingly, if neither the conidtion 1 nor the condition 2 is met, it follows that the read value is returned.

Figure 24:
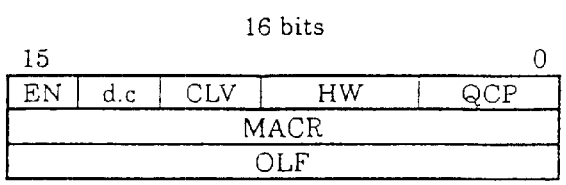
FIG. 24 is a diagram illustrating a construction of an ER2 information register.

Then, the above MACR calculated result is stored together with the following information in an ER2 information register illustrated in FIG. 24. Referring to FIG. 24, the symbol EN denotes an ER2 informnation valid flag, CLV represents a congestion level, HW indicates an output HW, QCP desingates an RM-cell QCP, and OLF represnets a load coefficient, respectively.

In an ER2 calculation block, ER2 is calcaulted based on varous pieces of information given from the above MACR calculation block. This calcualtion is conducted in the following steps (1) and (2).

(Condition 1)
When congestion level=0, congestion level=1, and load coefficient OLF≦1,
ER2=MACR (Condition 2)
When congestion level=1, and load coefficient LOF>1,
ER2=MACR/OLF (Condition 2)
When congestion level≧2,
ER2=0

The calculation of MACR/OLF in the condition 2 is carried out by the division in the rate representation in the same way with the above-mentioned calculation of the load coefficient.

(2) ER2 calculated is, with the HW/QCP class serving as an address, stored in an F-RM area in an ERV Table.

Figure 17:
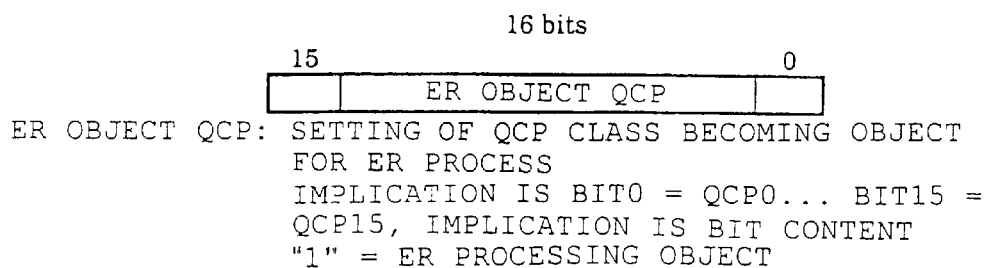
FIG. 17 is a diagram showing a construction of an ER object QCP register.
Figure 31:
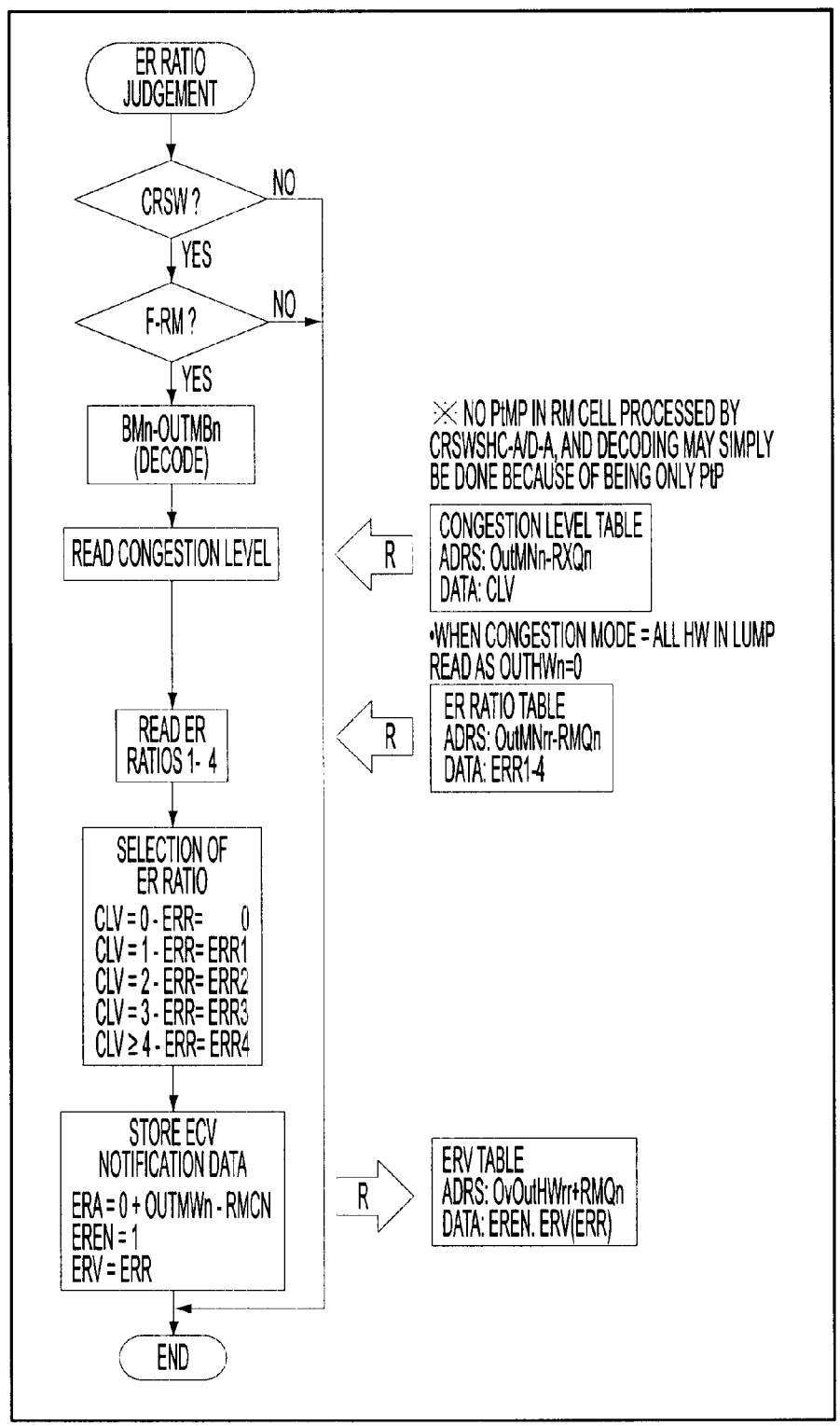
FIG. 31 is a processing flowchart of an ER ratio judgement block.

In an ER ratio judgement block, there is executed a process shown in a flowchart of FIG. 31 with respect to an ER object QCP judged by the ER object QCP register shown in FIG. 17.

Figure 25:
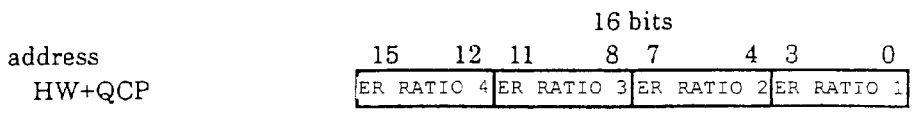
FIG. 25 is a diagram showing a structure of an ER ratio table.

To begin with, ER ratios 1–4 are read from an ER ratio Table shown in FIG. 25, wherein the output HW/RM-cell QCP notified from the cell classification judgement block serves as an address. Then, the ER ratio is selected based on the congestion level read in the congestion level judgement block (FIG. 19).

Figure 26:
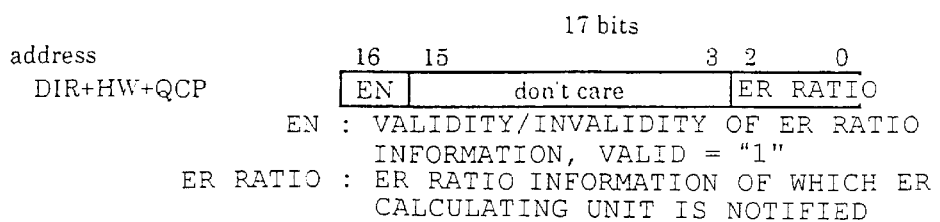
FIG. 26 is a diagram showing a structure of an ERV table.

The information on the thus selected ER ratio is stored in an ERV Table shown in FIG. 26, with DIR, the output HW and the RM-cell QCP serving as addresses. Note that En is set such as EN=1 in the case of storing the valid information.

Figure 27:
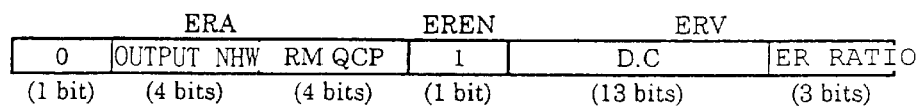
FIG. 27 is a diagram showing a format for notification to HWIF.
Figure 32:
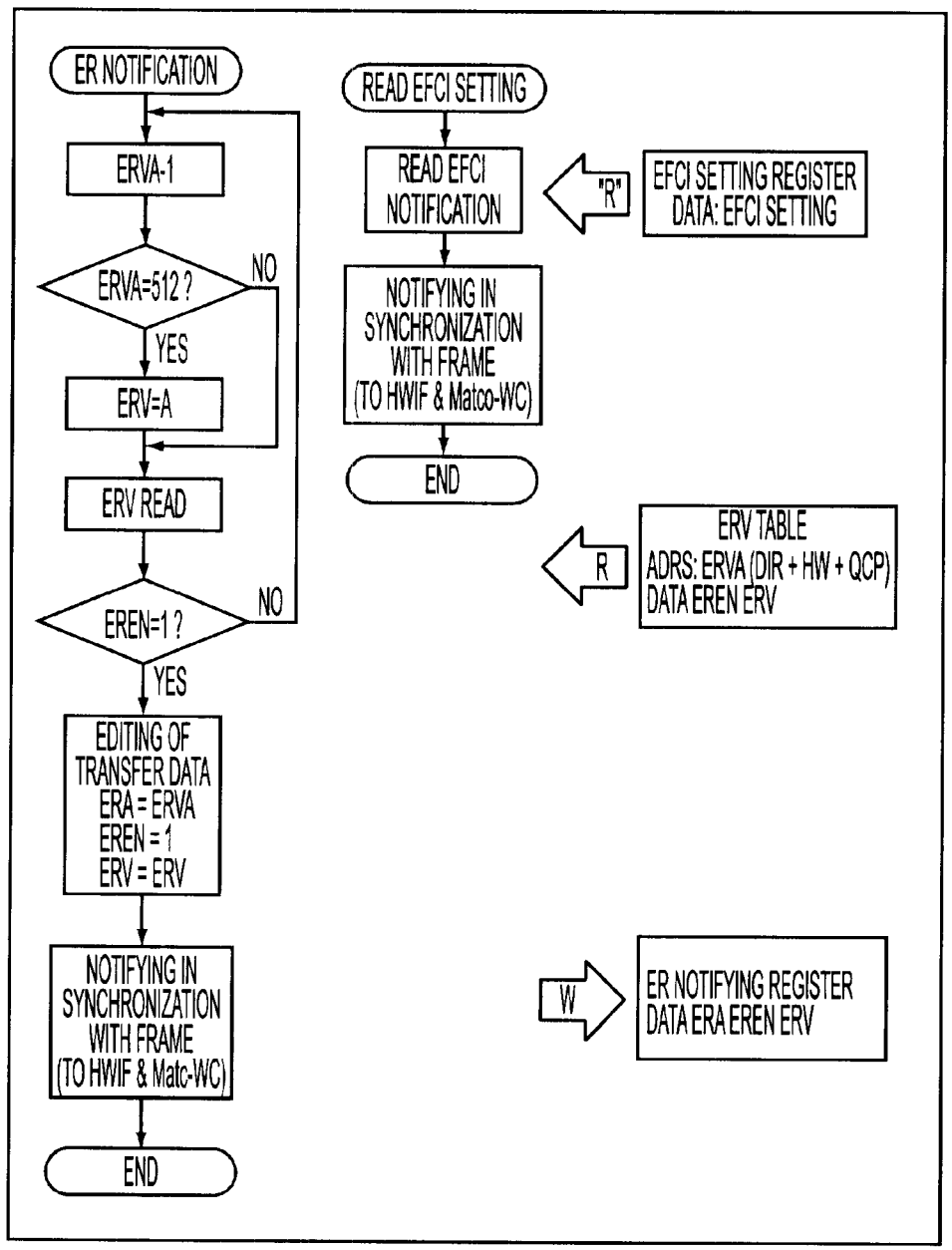
FIG. 32 is a processing flowchart of an ER notifying block.

In an ER notifying block, the ER ratio information is read from the ERV Table at the interval of a fixed period in accordance with a processing flow shown in FIG. 32, and an ER comparing/overwriting unit (HWIF) is notified of this item of information. FIG. 27 shows a format of the notified information in the F-RM cell area of the ERV Table at that time.

Figure 28:
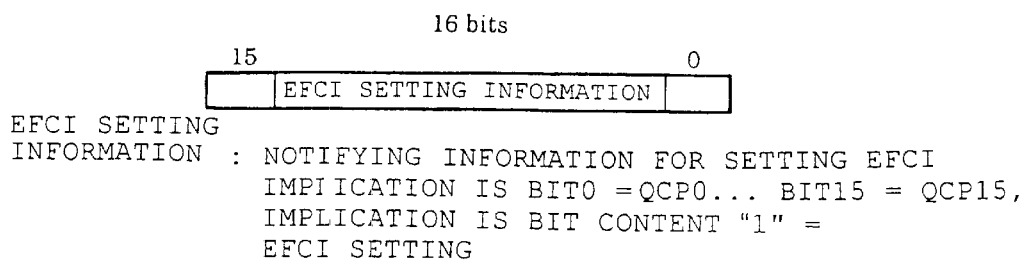
FIG. 28 is a diagram showing a format of EFCI setting information.

In parallel with the above-mentioned process, an EFCI setting unit (HWIF) is notified of EFCI setting information. FIG. 28 shows a format of EFCI setting information at that time.

Figure 33:
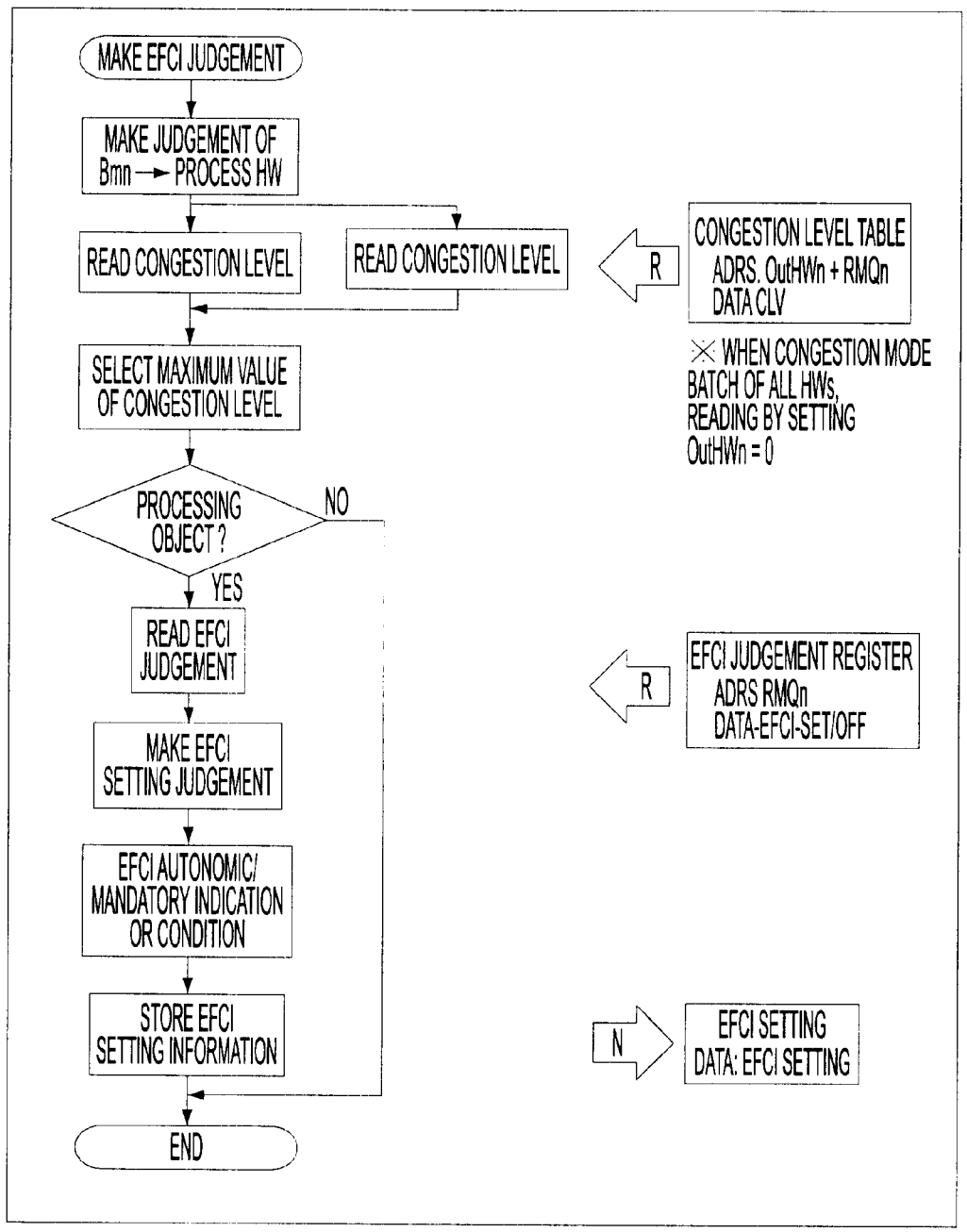
FIG. 33 is a processing flowchart of an EFCI judgement block.

In an EFCI judgement block, an ON/OFF judgement of an EFCI marking process is made based on the congestion level per output HW/QCP in accordance with a processing flow shown in FIG. 33. Then, this EFCI judgement block is further classified into a congestion level judging unit and an EFCI judging unit.

The congestion level judging unit reads the congestion level from the congestion level Table shown in FIG. 19, in which the output HW information and the RM-cell QCP class that are notified from the cell classification judgement block serve as addresses. Note that if the congestion monitoring is done in the QCP mode, there is used only the part corresponding to HW=0.

The congestion monitoring process mode is set in the register illustrated in FIG. 20, and the EFCI judgement block is notified of a content thereof.

As discussed above, according to the present invention, there are separated the management cell transfers between the transmitting terminal (a receiving terminal) and the individual device, and between the intra-system relay devices, whereby the allowed rate can be determined promptly without causing a delay of determination of the transmission allowed rate due to a delayed arrival of the management cell.

Further, the allowed bandwidth calculated is modified based on the congestion judgement, whereby a more accurate transmission allowed rate can be determined.

What is claimed is:

1. ATM management system interposed between a transmitting terminal and a receiving terminal, comprising:

a transmitting-side individual unit, provided on the side of said transmitting terminal, for accommodating a transmitting-side line;

incoming management cell control means, provided in said transmitting-side individual unit, for forming a first control loop for transferring an incoming management cell with respect to said transmitting terminal;

a receiving-side individual unit, provided on the side of said receiving terminal, for accommodating a receiving-side line;

outgoing management cell control means, provided in said receiving-side individual unit, for forming a second control loop for transferring an outgoing management cell with respect to said receiving terminal;

an interposing device, interposed between said transmitting terminal and said receiving terminal, for permitting intra-device management cell to pass through; and intra-device management cell control means, provided between said transmitting-side individual unit and said receiving-side individual unit, for forming a third control loop for transferring the intra-device management cell; wherein each management cell is stored with bandwidth rate information; and each of said individual units includes at least:

bandwidth extracting means for extracting the bandwidth rate information from each of the management cells arrived; and a transmission allowed rate calculating unit for calculating a rate of the cells allowed for transmission on the basis of the bandwidth rate and congestion information;

wherein said transmission allowed rate calculating unit calculates an allowed bandwidth on the basis of a cell outflow value registered in the management cell, makes a congestion judgment on the basis of a load observation using the number of cells received in a predetermined period of time, and modifies the allowed bandwidth with a value of this judgement.

2. An ATM management system according to claim 1, wherein said load observation is a calculation value that is executed per output HW/QCP class.

3. An ATM management system according to claim 1, wherein said load observation is a calculation value that is implemented with an integration of a plurality of QCP classes designated per output HW (QCP class).

* * * * *

UNITED STATES PATENT AND TRADEMARK OFFICE
CERTIFICATE OF CORRECTION

PATENT NO.    : 6,430,157 B1
DATED         : August 6, 2002
INVENTOR(S)   : Shiro Uriu et al.

It is certified that error appears in the above-identified patent and that said Letters Patent is hereby corrected as shown below:

Title page,
Item [56], U.S. PATENT DOCUMENTS, References Cited, to read:
-- 5,909,443A. --

Column 11,
Line 31, should read:

-- AN INTRA-DEVICE MANAGEMENT CELL. --

Signed and Sealed this

First Day of April, 2003

JAMES E. ROGAN
*Director of the United States Patent and Trademark Office*